Sept. 17, 1940.                P. W. ADLER                2,215,283
LINE SUPPORTING CLIP
Filed July 6, 1938
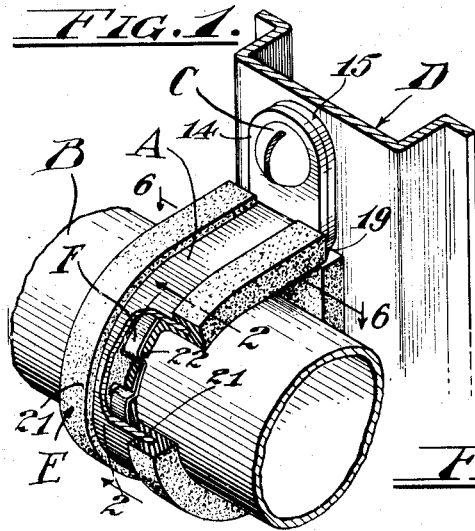
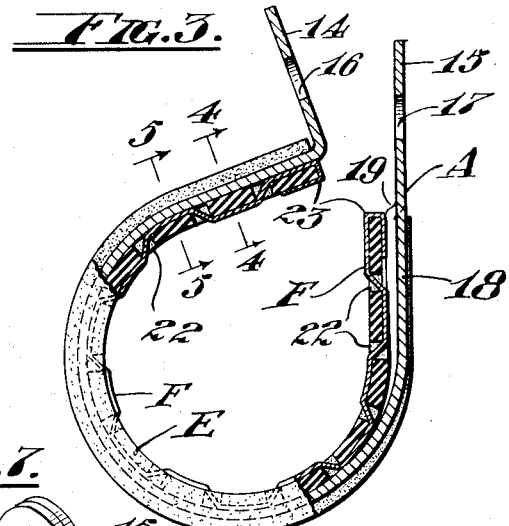
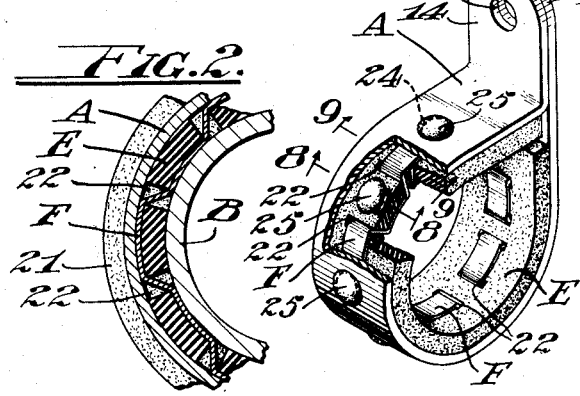
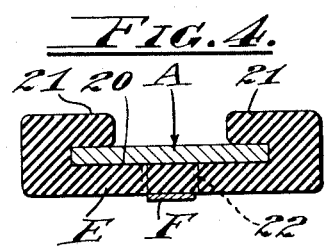
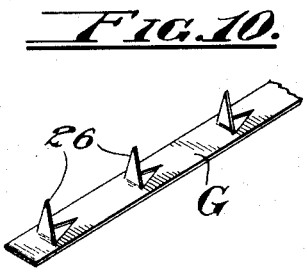
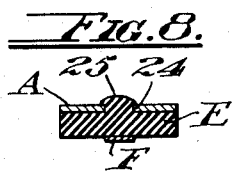
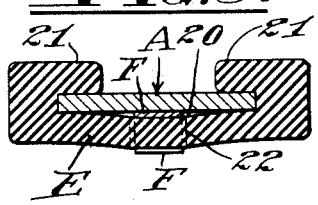
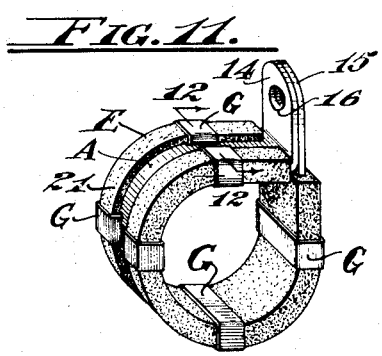
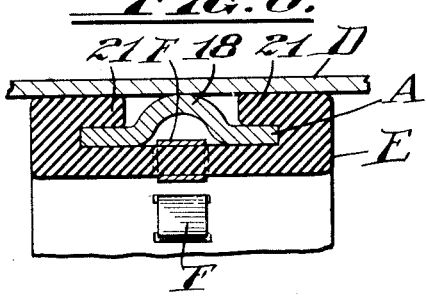
Inventor
Paul W. Adler
By R. S. Berry
Attorney

Patented Sept. 17, 1940

2,215,283

UNITED STATES PATENT OFFICE 2,215,283

LINE SUPPORTING CLIP

Paul W. Adler, West Hollywood, Calif., assignor to Adel Precision Products Corporation, Burbank, Calif., a corporation of California Application July 6, 1938, Serial No. 217,697

6 Claims. (Cl. 174—40)

This invention relates to a clip for supporting fuel, oil, electrical conduits and similar lines and equipment and more especially where electrical grounding and resiliency of support are requisite.

An object of the invention is to provide a device of the above character which embodies a metallic band or strap formed to encompass a line or conduit and adapted to be fastened to a supporting structure by means of bolts or similar fastenings, in which a resilient cushion is interposed between the metallic band and the line or conduit to afford a flexible or yielding support therefor, together with a static strip arranged to afford an electrically conductive connection between the line or conduit and the metallic band.

With the conventional type of clips, especially the metal type now in use, it is absolutely essential that the metallic band of the clip be accurately formed and with the required bolt holes precisely aligned in order to provide a satisfactory support. Inasmuch as these parts are used by the hundreds of thousands, it is difficult to obtain sufficient production accuracy to meet the requirements of the more exacting industries. Even slight variations from the nominal dimensions required necessitate considerably longer installation time with accompanying increase in cost which, while not being at once apparent to the manufacturer, is nevertheless excessively high both in actual cost and in incidental delay in production time.

By applying a resilient cushion to the metallic band it is possible to obtain a much higher degree of clamping action than is possible with the plain metal. The use of a resilient cushion, formed of rubber, rubber composition, leather, felt, and the like, not only reduces the effect of slight variations in manufacturing tolerances but also provides a much greater clamping action than is obtained with the usual materials, and at the same time obtains flexibility hitherto unavailable in conventional designs.

In addition to permitting considerable latitude in manufacturing tolerances of the clip itself, the application of the resilient suchion to the clip makes it possible to install parts which slightly deviate from the regulation manufacturing dimensions. It is therefore possible to utilize lines and conduits which might otherwise have to be rejected, with attendant scrapping, or at least expensive re-work. This feature makes possible substantial savings in production costs and reduction in production time. With conventional metallic line supports it is necessary, especially in aircraft work, to protect the lines from the clip by the application of sleeves of composition Neoprene, rubber or other synthetic materials, which are extremely inconvenient to install and do not provide satisfactory insulation from vibration. The cost of installation of such sleeves is often considerably greater than the entire cost of material and clips involved in the operation.

There have been numerous instances, especially in aircraft work, where lines have been damaged to the point of failure by extensive vibration and/or abrasions due to direct contact with clips and in some instances due to contact with intermediate protecting sleeves.

By varying the thickness of cushion used with the clip it is possible to provide supports with varying frequency characteristics to suit the particular application for which the support is to be applied. With conventional clips it is necessary to provide sufficient width to insure positive clamping of the line in order that no chafing action may be set up by the vibrations present. By the application of cushioning material directly to the clip as contemplated by my invention it is possible to obtain a unit which has equal or less overall width than the plain metal clip, and which weighs approximately the same or in many cases less than the metal clip of equally satisfactory design.

Another object of the present invention is to provide a simple foolproof and efficient means of electrically bonding the material to be supported by means of a narrow strip of electrically conductive bonding material associated with the cushioning material and making direct contact with the metal clip which forms the base of the entire unit. By providing such bonding it is not only possible to obtain extremely low resistance bonding, but it is also possible to obtain superior bonding without placing any responsibility for such bonding upon the workman making the installation. This assurance is of prime importance where production lines are working close to definite schedules which must be adhered to.

Another improvement incorporated in my clip is the addition of a beaded section on the straight end of the metallic base clip. This bead adds considerable rigidity to the clip without the possibility of the usual distortion prevalent with conventional clips. The use of this bead makes it possible to reduce the gauge of the material used and yet obtain better results than with the plain clips commercially available.

A further object is to provide a construction in the clip whereby secure interconnection of the several parts thereof is readily attained and whereby the possibility of accidental separation and displacement of the associated parts is obviated.

With the foregoing objects in view, together with such other objects and advantages as may subsequently appear, the invention is carried into effect as illustrated by way of example in the accompanying drawing, in which:

Fig. 1 is a perspective view of the clip with portions broken away showing it as applied in supporting a conduit;

Fig. 2 is a detail in section taken on the line 2—2 of Fig. 1 and as seen in the direction indicated by the arrows;

Fig. 3 is a view in side elevation partly in longitudinal section of the clip shown in Fig. 1 showing it as detached;

Fig. 4 is an enlarged detail cross section taken on the line 4—4 of Fig. 3;

Fig. 5 is an enlarged detail section taken on the line 5—5 of Fig. 3;

Fig. 6 is an enlarged detail section taken on the line 6—6 of Fig. 1; and as seen in the direction indicated by the arrows;

Fig. 7 is a perspective view with parts broken away of a modified form of the invention;

Fig. 8 is a detail in cross section as seen on the line 8—8 of Fig. 7;

Fig. 9 is a detail in cross section taken on the line 9—9 of Fig. 7;

Fig. 10 is a perspective view of a fragmentary portion of a modified form of static strip;

Fig. 11 is a perspective view of another modified form of the invention;

Fig. 12 is an enlarged detail in cross section taken on the line 12—12 of Fig. 11.

Referring to the drawing more specifically A indicates generally a flexible metallic strip which is bent to form a band adapted to encompass a conduit or line B with the end portions 14 and 15 of the strip arranged to overlie each other with apertures 16 and 17 in such end portions registering with each other for the reception of a bolt C whereby the clip may be fastened to a suitable support D as particularly shown in Fig. 1.

In forming the clip to provide the overlying end portions its intermediate portion is bent in the form of a fragment of a circle with its end portions leading tangentially therefrom and with the end portion 14 bent outwardly at right angles relative intermediate the length of the tangential portion so that such end portion 14 may be positioned to overlie the end portion 15 in parallel relation thereto on fastening the clip to a support but which end portions are normally spaced apart as shown in Fig. 3.

The tangential end portion 15 is designed to be seated against the surface of the support D under the clamping action of the bolt C. As a means for stiffening the end portion 15 against bending outwardly away from the support and also against twisting, a longitudinally extending bead or rib 18 of arcuate cross section is pressed in the end portion 15, which rib terminates at one end in spaced relation to the outer end of the portion 15 a distance approximating the length of the angularly extending part of the end portion 14, and the other end of which leads and merges into the curved portion of the loop at the base of the tangential end portion 15 so as to strengthen the juncture of the loop and end portion 15 against straightening out under outward stress imposed at this point.

The rib 18 is formed with its channel side extending inwardly of the loop with its outer arched face presented rearwardly of the strap to abut the support D as particularly shown in Fig. 6, whereby the side marginal portions of the tangential end portion 15 will be spaced from the support except at that end part of the strap extending beyond the outer end of the reinforcing rib 18 which part is bent at 19 to dispose the back face thereof on a plane with outermost portion of the rib 18.

In carrying out the invention the loop portion of the strap A is lined on its inner periphery by a cushion E composed of rubber, rubber composition, or similar resilient material; the cushion E extending along the strap A from a point adjacent the base of the out-turned end portion 14 to the outer end of the reinforcing rib 18. In the construction shown in Figs. 1 to 6 inclusive the cushion E is formed on one side thereof with a longitudinally extending channel 20 the side walls of which are formed with inturned flanges 21 adapted to overlie and grip the outer faces of the side margins of the strap A seating in the channel 20 whereby the cushion E is securely held in place on the strap. The portions of the flanges 20 overlying the end portion 15 of the strap extend along opposite sides of the rib 18 as shown in Fig. 6 and are formed to seat against the support D under compression on tightening the bolt C so as to securely clamp the inner end portion of the cushion between the strap A and the support D.

The cushion E is fitted with a static or grounding strip F consisting of a length of thin, flexible electrically conductive metallic ribbon, which strip extends longitudinally of the cushion E and is rove in and out through openings 22 formed at spaced intervals throughout the length of the cushion in the bottom wall of the channel thereof whereby short lengths of the static strip will extend alternately interiorly and exteriorly of the cushion with the portions overlying the bottom of the channel 20 abutting the strap A and with the portions overlying the inner face of the cushion arranged to contact the periphery of the line or conduit B carried by the clip, as shown in Figs. 1 and 2. The end portions of the static strip F are hooked over the ends of the cushion E as indicated at 23 in Fig. 3.

In the form of the invention shown in Figures 7, 8, and 9, the portion of the strap A covered by the cushion E is formed with a series of openings 24 spaced apart longitudinally thereof and the cushion E is formed with buttons 25 which are engaged in the openings 24 as particularly shown in Fig. 8 to effect interconnection between the cushion E and the strap A. With this arrangement the inturned flanges 21 may be omitted and the cushion formed of a width approximating that of the strap A. When this construction is employed the openings 22 are formed in the cushion to provide a pair of the openings between adjacent buttons 25.

In the construction shown in Figs. 11 and 12, another arrangement of static strip is employed, and in which a series of lengths G of electrically conductive metallic ribbon are bent to extend transversely around the channeled cushion E in conformity therewith. By this arrangement portions of the strips G overlie both the inner and outer faces of the cushion E with the connecting portions extending around the edges of the cushion instead of passing through it as in the arrangement shown in Figs. 3 and 7. The portions of the strips G overlying the walls of the channel 20 will effect electrical connection with the strap A while the portions of the strips G overlying the inner periphery of the cushion E will effect electrical connection with the outer periphery of a conduit or line encompassed by and engaged in the clip.

While the static strip F or G may be smooth throughout the length thereof as shown in Figs. 3 and 12 it may in some instances be formed with spurs 26 struck therefrom as shown in Fig. 10 which spurs are adapted to be pressed into engagement with the cushion E to effect anchorage of the static strip on the latter.

In the operation of the invention, the strap A and its associated cushion E and static strip F being flexible, the end portions of the strap may be spread apart by flexing the loop portion of the clip so as to permit positioning of the clip around a conduit or line B. The end portions 14—15 of the clip are then brought close together and a bolt or screw C is passed through the openings 16 and 17 in the strap end portions and is engaged with a support D in the usual manner. Tightening of the bolt or screw will draw the end portion 14 toward the end portion 15 and will thereby contract the loop so as to bring the cushion E and the static strip into close contact with the outer periphery of the conduit or line B; the loop, of course, being formed of a diameter according to the size of conduit or line to be supported to effect requisite fit on the latter.

The cushion E being resilient is subject to being compressed on contacting the clip around the conduit or line B, so as to be placed under tension, and which state of compression may be varied to impart to the cushion more or less yieldability according to requirements and whereby the conduit or line may be supported by the clip to have but little movement relative thereto or be carried thereby in a fashion to permit limited flexibility of the conduit or line.

When the clip is secured in place adequate electrical grounding will be effected through the static grip F which affords electrical connection between the conduit or line and the strap A which in turn is carried on a grounded metallic support D in contact therewith.

An important provision of this invention is that the strap is tensioned, and the cushion is under compression while the grounding strip is substantially static, inert or substantially non-tensioned, when the clip of any of the forms hereof is in use. By having these parts arranged as aforesaid and the strip free from appreciable tension as accomplished by forming the strip of thin flexible material and mounting the strip so that it will move without resistance or substantially "float" with the cushion, as the latter is compressed, a good electrical contact of the strip with the strap and line is insured, and such relative movement as might produce undesirable friction and wear and tensioning and consequent breaking of the strip or rupturing of the weld joints or anchorage connection between the strip and strap is avoided, and at the same time the full cushioning action of the cushion is not impaired even where the strip lies between the line and the cushion.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a line support, a metallic strap formed into a loop having end portions attachable to a support, a resilient cushion overlying the inner periphery of the loop, and an electrically conductive metallic strip on said cushion having portions overlying the outer face of said cushion seating on said strap and having other portions overlying the inner face of said cushion to contact a body gripped by said cushion to prevent accumulation of static electricity in said body.

2. In a line support, a metallic loop having end portions attachable to a support, a resilient cushion lining the inner periphery of said loop, and a circumferentially extending metallic conducting strip rove through said cushion with portions thereof contacting said loop and with alternating portions overlying the inner face of said cushion to prevent the accumulation of static electricity in a body gripped by said cushion.

3. In a line support, a metallic loop having end portions attachable to a support, means for securing both of said end portions to a support, a cushion lining the inner periphery of said loop, circumferentially spaced apart projections on said cushion extending through said loop, and a static strip carried by said cushion overlying the inner face thereof in radial alignment with said projections and overlying the outer faces thereof between said projections.

4. In a device of the kind described, a strap-like loop having end portions attachable to a support, means for securing both of said end portions to such support, a cushion lining the inner periphery of said loop, said cushion having at each side an inturned flange positioned to overlie and grip the outer face of the side margin of said metallic loop, said cushion having along its mid-width a series of circumferentially spaced transverse slots, and a metallic conducting strip rove through said slots in a position to contact alternately with the inner periphery of said looped metal strap and a cylindrical body gripped by said cushion.

5. A support for a metallic conduit comprising a strip of resilient material, an electric conductor carried by said strip having portions passing through said strip at spaced intervals and having portions overlying both sides of said strip, a flexible metallic strap formed into a loop with extended ends, means interconnecting said resilient strip to the inner face of the looped strap with the portions of said conductor on one side of said strip contacting said strap, and means for fastening the ends of said strap to a supporting structure with the resilient strip in the loop thereof and the conductor thereon contacting a conduit engaged by the support.

6. In a line support, a metallic strap formed into a loop having end portions attachable to a support, a resilient cushion interposed between said strap and said line, and an electrically conductive metallic strip incorporated in said cushion and having portions exposed on each side thereof for contact with said strap and said line for preventing accumulation of static electricity in said line.

PAUL W. ADLER.